US008063849B2

United States Patent
Gustafsson et al.

(10) Patent No.: US 8,063,849 B2
(45) Date of Patent: Nov. 22, 2011

(54) METHOD OF NAVIGATING IN A SURROUNDING WORLD CAPTURED BY ONE OR MORE IMAGE SENSORS AND A DEVICE FOR CARRYING OUT THE METHOD

(75) Inventors: Torbjörn Gustafsson, Linköping (SE); Per Carleberg, Stockholm (SE)

(73) Assignee: Totalförsvarets Forskningsinstitut, Stockholm (SE)

( * ) Notice: Subject to any disclaimer, the term of this patent is extended or adjusted under 35 U.S.C. 154(b) by 599 days.

(21) Appl. No.: 11/919,511

(22) PCT Filed: Apr. 28, 2006

(86) PCT No.: PCT/SE2006/000510
§ 371 (c)(1),
(2), (4) Date: Feb. 2, 2009

(87) PCT Pub. No.: WO2006/118524
PCT Pub. Date: Nov. 9, 2006

(65) Prior Publication Data
US 2009/0303159 A1 Dec. 10, 2009

(30) Foreign Application Priority Data
Apr. 29, 2005 (SE) .................................... 0500980

(51) Int. Cl.
*G09G 5/00* (2006.01)
(52) U.S. Cl. ............................................ 345/8; 359/630
(58) Field of Classification Search .................. 345/156, 345/7–9; 349/13; 359/630–633; 463/30–34
See application file for complete search history.

(56) References Cited

U.S. PATENT DOCUMENTS

| 4,028,725 | A | 6/1977 | Lewis |
| 4,303,394 | A | 12/1981 | Berke et al. |
| 4,340,878 | A | 7/1982 | Spooner et al. |

(Continued)

FOREIGN PATENT DOCUMENTS
SE  0401603  12/2005

OTHER PUBLICATIONS

Belt, et al., "Combat Vehicle Visualization System," http://cg.cis.upenn.edu/~reich/paper11.htm, 2007.

*Primary Examiner* — Stephen Sherman
(74) *Attorney, Agent, or Firm* — Jacobson Holman PLLC

(57) ABSTRACT

A method for a user to navigate in a surrounding world captured by one or more image sensors and displayed to the user in an image display area of a display device which in use is in front of the user's head and follows the movements of his head. When the user's head is directed in an area which the user can easily reach by turning his head, the display is controlled by his head direction. When the head direction reaches the edge of what the user can reach by turning his head, use is instead made of controlling by gaze direction of that displayed, in which case the point of the surrounding world pointed out by the gaze direction is continuously placed in a predetermined area of the image. The change occurs either automatically by the user's gaze direction being at the edge of the image display area or by a command, for instance with the user's voice or a motion of his hand.

16 Claims, 3 Drawing Sheets

U.S. PATENT DOCUMENTS

| | | |
|---|---|---|
| 4,348,186 A | 9/1982 | Harvey et al. |
| 4,757,380 A | 7/1988 | Smets et al. |
| 4,884,219 A | 11/1989 | Waldren |
| 5,200,856 A | 4/1993 | Beaussant |
| 5,394,517 A * | 2/1995 | Kalawsky .................... 345/632 |
| 5,621,424 A * | 4/1997 | Shimada et al. ................. 345/8 |
| 5,689,619 A * | 11/1997 | Smyth ............................ 706/45 |
| 5,742,264 A | 4/1998 | Inagaki et al. |
| 5,751,259 A | 5/1998 | Iwamoto |
| 6,847,336 B1 | 1/2005 | Lemelson et al. |
| 2004/0061831 A1 | 4/2004 | Aughey et al. |
| 2007/0247457 A1 | 10/2007 | Gustaffson et al. |

* cited by examiner

METHOD OF NAVIGATING IN A SURROUNDING WORLD CAPTURED BY ONE OR MORE IMAGE SENSORS AND A DEVICE FOR CARRYING OUT THE METHOD

This is a national stage of PCT/SE2006/000510 filed Apr. 28, 2006.

BACKGROUND OF THE INVENTION

1. Field Of The Invention

The present invention relates to a method and a device for navigating, by indirect vision, in a surrounding world which is captured by one or more image sensors and displayed to a user via a display device which in use is in front of the user's head and follows the movements of his head. The display device can be headworn or handheld or arranged on a mechanical device so that it can be positioned in front of the user. The latter can occur, for instance, by the display device being carried by an arm so that it can be moved with the user's hand or in some other manner in front of the user when swivelling on a chair capable of rotating. In the following only the headworn case will be discussed since as a rule this is most relevant, but there may be situations when the display device is held in front of the user's eyes in some other way, but otherwise functions just like in the headworn case.

2. Description Of The Related Art

In military contexts it is important to have a visual perception of the surrounding world. The surrounding world is usually registered directly by the eyes or via an optical periscope. Such periscopes can be found, for example, in combat vehicles or in submarines. However, new requirements and threats have created a need to be able to obtain a perception of the surrounding world via image sensors, usually cameras, whose image data is displayed, for instance, on a screen. This technique is referred to as indirect vision. In these contexts image data is captured and displayed in real time, which here means at such a speed that the user experiences a continuity in movements. A number of 20 images per second is usually considered a minimum for real time, but may in some cases be lower.

Indirect vision is used for several reasons. One reason is to be able to capture image information that the eye cannot see. By using, for example, image sensors of the Night Vision type or image sensors sensitive to thermal IR radiation, the perception of the surrounding world can be reinforced. Another reason for indirect vision is to protect the eyes against eye-damaging laser radiation. In military context, a combat vehicle may also reveal itself by the light or radiation emitted from the illuminated interior via an optical periscope.

The images that are displayed by indirect vision to a user may come from an image sensor device in real time or recorded, from a virtual surrounding world or as a combination of these techniques. An image sensor device may comprise, for instance, one or more video cameras sensitive to the visual wavelength band, IR cameras sensitive in one of the IR bands (near IR, 3-5 µm, 8-12 µm), UV cameras or other direct or indirect image-producing sensor systems, such as radar or laser radar. Images from different sensor systems may also be combined by data fusion and be jointly displayed to the user.

In a system for indirect vision, the image sensors need not be positioned close to the user. The user may be located in any physical place. He is thus virtually in the place of the sensors although he is not located where the image sensors are positioned. To allow the user a good perception of the surrounding world, it should be captured and displayed in a field of vision that is as large as possible since this is the way in which we naturally experience the surrounding world. However, this cannot always be achieved; for instance, in a combat vehicle there is not much space for large screens. A way of solving this problem is to provide the user with a headworn display device which may consist of one or more miniaturised screens which are viewed via enlarging optics, or a device which projects/draws images directly on the user's retina.

In use of a headworn display device, an image can be displayed to a single eye, monocular display. When using two screens, the same image can be displayed to both eyes, biocular display, or two different images are displayed, one for each eye in what is referred to as binocular display. In binocular display, a stereoscopic effect can be achieved. By using additional screens adjacent to and outside (to the left and to the right of) screens straight in front of the eyes, a peripheral vision can also be achieved. The screens can preferably be indirectly fastened to the user's head by some kind of device similar to a spectacle frame or helmet.

The visual impression normally changes as the user's head moves. The image which, via a headworn screen, is displayed to a user is, however, usually not affected by the user's head moving relative to the surrounding world. The feeling of not being able to change the visual impression by movements is by most people using headworn screens experienced as frustrating after a while. The normal behaviour of scanning the surrounding world by turning the head and looking around does not work.

A solution to this is to detect the position and direction of the user's head by a head position sensor. The image displayed to the user by the headworn screen can then be adjusted so that the user experiences that he can look around himself.

By using indirect vision where the user carries a headworn display device and where the position and direction of the user's head are detected, the user in a combat vehicle may get a feeling of seeing through the walls of the vehicle, "See-Through-Armour", in the following abbreviated STA.

Three techniques of providing an STA system will be presented below:

1. The STA system is based on an image sensor device which is placed on a gimbal, see FIG. 1, which is movable in several directions. The gimbal, which can be controlled from a head position sensor, can be oriented from the direction of a user's head. The image from the image sensor device is displayed to the user via a headworn display device.

2. The STA system is based on an image sensor device which captures the surrounding world by a plurality of image sensors where each image sensor captures a part of a large surrounding world, see FIG. 2. The user carrying a headworn display device will have image data displayed to himself, which is pointed out by a head position sensor.

Such a system is known from the article "Combat Vehicle Visualization System" by R. Belt, J. Hauge, J. Kelley, G. Knowles and R. Lewandowski, Sarnoff Corporation, Princeton, USA, published on the Internet at the address: http://www.cis.upenn.edu/~reich/paper11.htm.

This system is called "See Through Turret Visualization System" and is here abbreviated STTV. In the STTV, the images from a multicamera device are digitised by a system consisting of a number of electronic cards with different functions. The electronic cards contain, inter alia, image processors, digital signal processors and image memories. A master processor digitises the image information from the multi-camera device, selects image information of one or two cameras from the direction of a user's head and puts them together without noticeable joints in an image memory and then displays that part of the image memory which corresponds to the direction of the user's head. The STTV manages to superpose simple 2-dimensional, 2D, virtual image information, for instance a hairline cross or an arrow that indicates in which direction the user should turn his head. The direction of the user's head is detected in the STTV by a head position sensor which manages three degrees of freedom. The three degrees of freedom are often called yaw, pitch and roll by analogy with that applied in connection with aircraft. In an aircraft yaw is the head direction in which the longitudinal axis of the aircraft is directed, pitch the nose direction around a transverse axis through the wings (nose up/nose down) and roll the angle position around the longitudinal axis.

3. The STA system is based on an image sensor device which captures the surrounding world by means of a plurality of image sensors where each image sensor captures a part of a large surrounding world and where information from the image sensors is placed as dynamic textures in a 3D model in a computer graphics system. The user carrying a headworn display device will have image data displayed to himself from the 3D model according to output data of a head position sensor regarding the position and direction of the user's head.

Such a system is disclosed in Swedish Patent Application No. 0401603-6, "Device and Method for Presenting an Image of the Surrounding World", with the same applicant and inventor as the present application.

In all these three systems, the direction of the user's head, and in some cases also the position of the head, controls which part of the surrounding world is to be displayed to the user.

With the user sitting on a chair or the like that cannot rotate, the user's surveillance of the surrounding world is limited owing to the limited mobility of his head. This could be attended to by means of a swivel chair, but in many cases, such as in a fighter aircraft, this is not practically possible. In addition, problems may arise by cables and other equipment getting entangled owing to the user's swivelling.

SUMMARY OF THE INVENTION

The present invention provides a solution to the problem of reaching with the eyes outside the area that can be reached when a display is controlled based only on a head's direction. This is achieved by the invention being designed as will be evident from the independent claims. The remaining claims define advantageous embodiments of the invention.

BRIEF DESCRIPTION OF THE DRAWINGS

The invention will in the following be described in more detail with reference to the accompanying drawing, in which.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The basic principle of the invention is to provide a system which allows a change, in a manner that is experienced as natural, from head control, as described above, to control by means of the user's eyes of that displayed to him. Gaze trackers are previously known and determine the gaze direction of an eye. Examples will be presented below.

Figure 3:
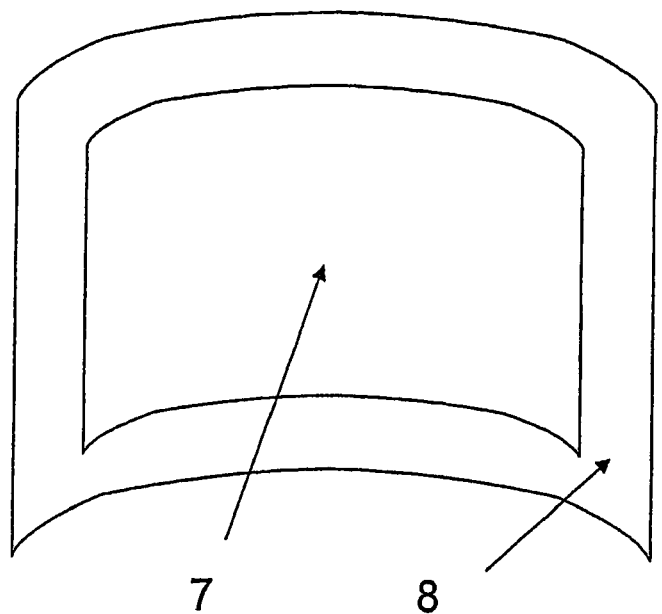
FIG. 3 illustrates the area, towards which a user's head can be directed.

FIG. 3 shows how according to the invention, in an area 7+8 that corresponds to the area towards which a normal individual can direct his head, an inner area 7 and an outer area 8 are defined. The outer area encompasses the inner area on all sides, but does not comprise the same. In the following, the area 7 is referred to as the inner head direction area and the area 8 the outer head direction area.

As long as the user's head direction points in the inner head direction area 7, the system retains head control of what is displayed. When the head direction is outside the inner head direction area, a change may occur, preferably automatically by the user directing his eyes in a certain way in the image, to control by gaze direction. This will be developed below. A conceivable alternative, which in some cases may be applicable, is that the user, when the head direction is outside the inner head direction area 7, by a command of some type, with his voice or a motion of his hand, orders the change.

The return to head control, which in fact is the normal case with a target in front of the user, can occur automatically when that part of the surrounding world which the user follows with his eyes has again entered the inner head direction area 7 of the user. It is also possible for the return to occur by the user actively giving some sort of command similarly to that when changing to control by gaze direction. It is quite possible to use automatic change from head control to control by gaze direction and a command-controlled change from control by gaze direction to head control and vice versa.

That displayed to the user is shown on a display device 9 which in use is positioned in front of the user's head and follows the movements of his head. In a first headworn variant of the invention, the display device is always positioned in front of the user's head and follows its movements. In another variant of a headworn display device which is attached to a helmet, it is possible to fold back the display device, for instance upwards towards the helmet, when it is not to be used.

The display device exhibits an image display area. In the same way as in the case with the head direction areas 7 and 8, the image display area can be divided into an inner image display area and an outer image display area. The outer area encompasses the inner area on all sides, but does not comprise the same. This is used in the automatic process of changing to control by gaze direction.

As long as the user's head direction points in the inner head direction area 7, it is the direction of the head that controls which image information in the inner and outer image display areas is displayed to the user.

When the head direction does not point in the inner head direction area (and thus points in the outer head direction area 8 or outside this, if this is possible) and the fixation point of an eye, that is the point in an image observed by the eye, is positioned in the inner image display area, it is also the direction of the head that controls which image information is displayed to the user.

When the direction of the head no longer points in the inner head direction area 7 and the fixation point has moved out of the inner image display area (and thus points in the outer image display area or outside this), there occurs in an advantageous embodiment of the invention a change to control by gaze direction which image information is displayed to the user.

In the case where it is the gaze direction that controls which image information is to be displayed, the system strives always to put the point of the surrounding world which the fixation point points out in a predetermined area of the image display area, preferably in or near the centre of the image display area. This technique allows the user to navigate by means of his eyes in the surrounding world captured by the image sensor device. In order to facilitate control by gaze direction, the momentary fixation point of the eye can be marked in the image, for instance as a hairline cross or a box.

When the gaze direction controls what is displayed, there is no reason for the user to sit with his head turned to an outer position, but he can settle himself comfortably with his head directed more or less straight forward, in any case within the inner head direction area 7.

At every moment the image display system is aware of where that part of the surrounding world is positioned which via the image sensors is displayed to the user. In a variant of the invention, this information can continuously be graphically displayed to the user as symbols or the like. When this part of the surrounding world is again positioned in the inner head direction area 7, it may in many cases be convenient for a return to head control of the display to the user to occur. This return can occur automatically when the condition is satisfied or because the user gives a command to the system after the system has drawn his attention to the situation.

Figure 1:
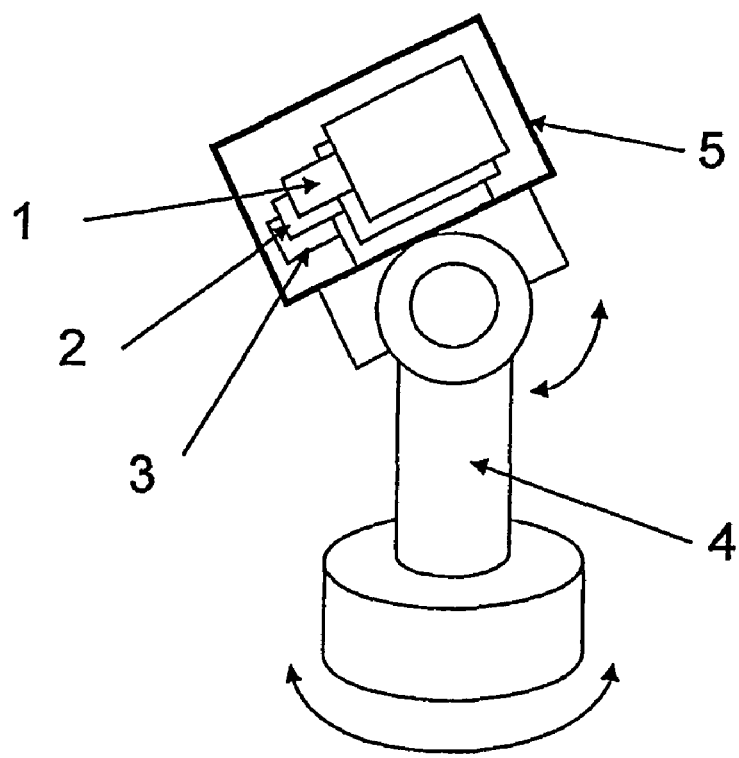
FIG. 1 illustrates a first image sensor device which can be used with the invention.

As stated above, FIG. 1 shows an example of an image sensor device 5. This comprises one or more image sensors 1, 2 and 3, such as cameras. The image sensor device is placed on a gimbal 4 which is a mechanical device which can direct the image sensor device. As a rule, directing occurs by means of electric motors and usually by the motions yaw and pitch, but also roll may occur.

Figure 2:
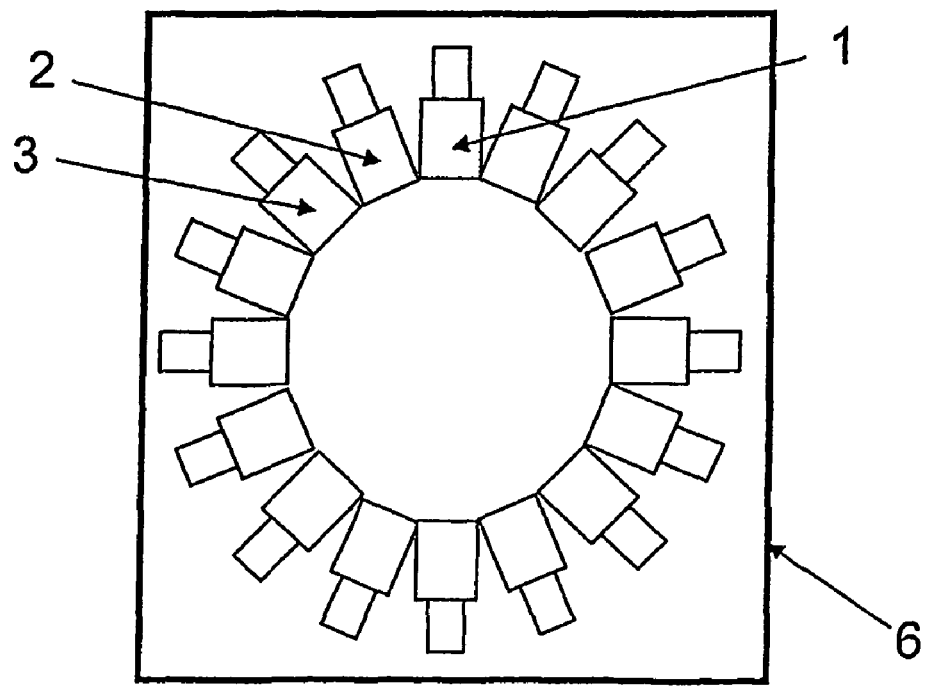
FIG. 2 illustrates a second image sensor device which can be used with the invention.

FIG. 2 shows an example of another image sensor device 6. This comprises a number of image sensors 1, 2 and 3, which are arranged in a ring so as to jointly cover an area, for instance through 360 degrees but in an area limited upwards and downwards.

Figure 4:
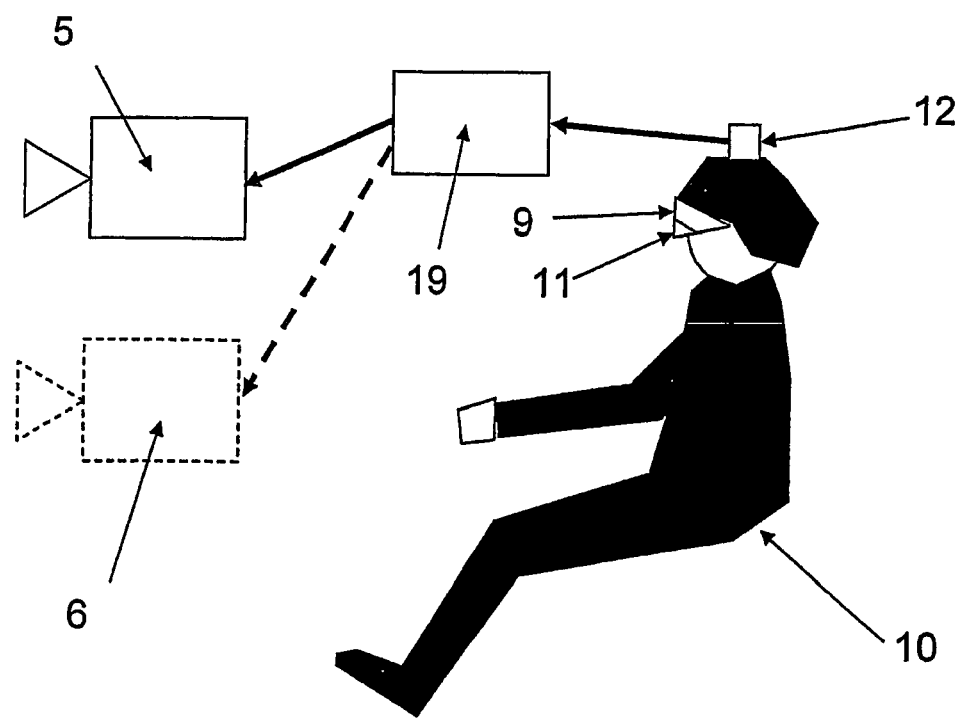
FIG. 4 illustrates a fundamental set-up of the invention involving a user with a headworn display device with an integrated gaze tracker and a head position sensor.

FIG. 4 shows a fundamental set-up of a device according to the invention. A user 10 has a headworn display device 9 with an integrated gaze tracker 11 and a head position sensor 12. The head position sensor 12 detects the direction of the user's head by three degrees of freedom, yaw, pitch and roll. In more advanced cases, also the position of the user's head can be detected in the form of the coordinates x, y and z.

Figure 5:
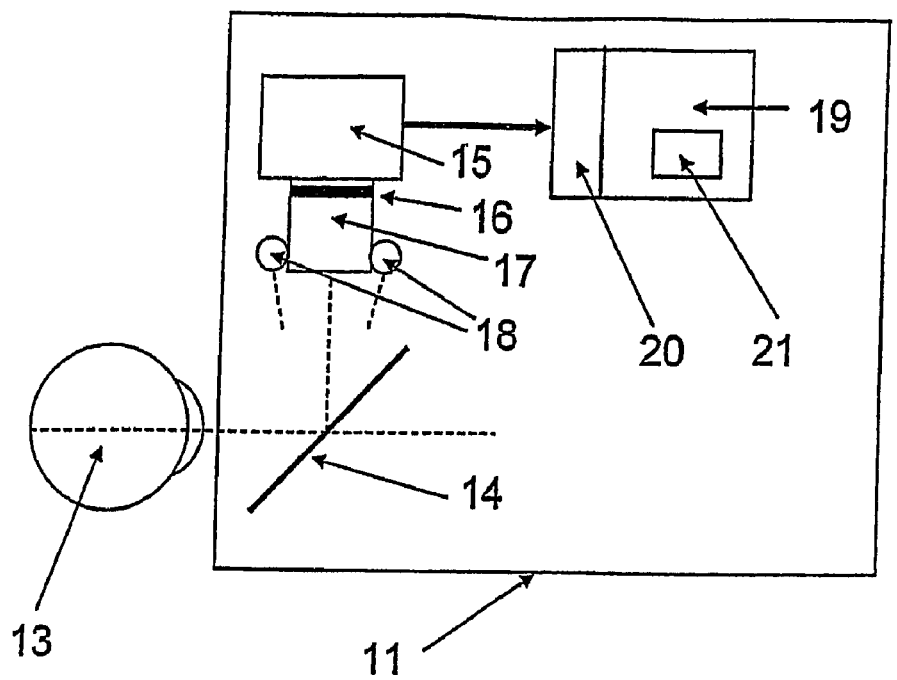
FIG. 5 illustrates an embodiment of a gaze tracker.

FIG. 5 shows an example of how the user's gaze direction can be detected by detecting the user's eye 13 by means of a gaze tracker 11 which consists of the following components:

A semitransparent mirror 14 with suitable optical properties. In this case the mirror is transmissive in the visual surrounding world at an angle of incidence of approx. 45 degrees and reflective in the near IR area (IR=Infra Red) also at an angle of incidence of approx 45 degrees. Such a semitransparent mirror is referred to as a hot mirror.

A camera 15 sensitive to near IR radiation including an objective 17.

Near IR illumination sources 18.

Filter 16 which only lets through near IR radiation.

A calculating unit 19, usually a computer.

Interface 20 between the camera 15 and the calculating unit 19.

Software for detecting gaze direction 21. The software recognises the pupil by image processing, such as filtering and thresholding. Similarly, the positions on reflections in the cornea from near IR illumination sources can be determined. This jointly provides sufficient information for the gaze direction to be determined.

Commercial systems are available which detect the gaze direction of a user. Some adaptation of such a system to the current use must, however, take place, inter alia since the gaze direction detection system according to the invention can be integrated with other systems.

Figure 6:
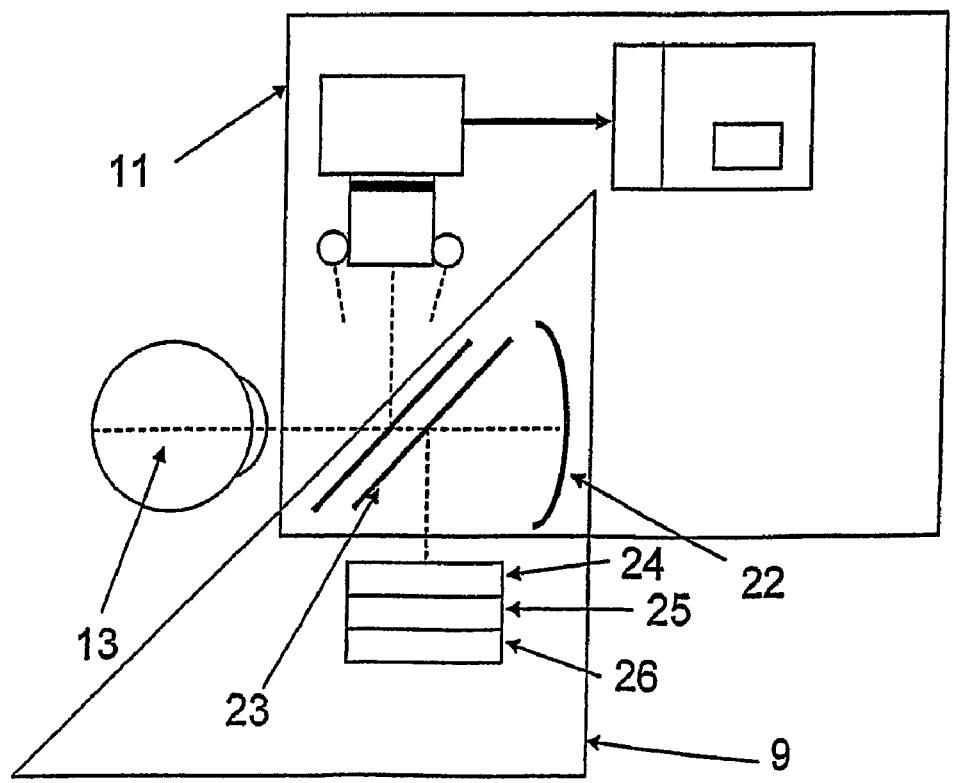
FIG. 6 illustrates a gaze tracker according to FIG. 5 integrated in a headworn display device.

FIG. 6 illustrates an example of how a gaze tracker 11 can be integrated in a headworn display device 9, where 22 is a semitransparent spherical mirror, 23 a flat semitransparent mirror, 24 a microdisplay, 25 lighting for the microdisplay and where 26 is driving electronics for the microdisplay.

The microdisplay 24 is illuminated from behind by the illumination source 25. The driving electronics 26 adjusts an image signal, for instance a VGA signal from a computer, to the requirements of the microdisplay. The microdisplay 24 supplies an image which in one example can be large as a thumbnail. This is enlarged and placed on a predetermined focal plane by means of the semitransparent spherical mirror 22 and the flat semitransparent mirror 23, which together form an optical system. The image presented by the microdisplay can in one example be enlarged so as to virtually occupy 30 degrees horizontally of a user's field of vision and it can, for instance, be placed on a virtual focal plane positioned 1.2 m from the user.

In the following a scenario will be described where the invention will be perfectly applicable: A user in a military helicopter can watch through a sensor device of the type 5 or 6. This sensor device is positioned under the helicopter and the observer (user) sits looking straight forward in the helicopter. Reconnaissance usually occurs in the travel direction of the helicopter, the user's head controlling the direction of the image sensor device. Now assume that a target comes into sight and that the observer must have full visual control of this target. At the same time the helicopter must turn off, which means that the observer turns his head to keep the target in view. If the turning of the helicopter continues sufficiently long, the observer reaches a position where he can no longer follow the target by turning his head. In this position, the control by gaze direction automatically starts functioning by the observer's head direction having entered the outer head direction area 8 and his eyes at the same time having moved into the outer gaze direction area, cf. that described above. The change to control by gaze direction gives the observer full visual control of the target independently of the movements of the helicopter.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

The invention claimed is:

1. A method for a user to navigate in a surrounding world captured by one or more image sensors and displayed to the user in an image display area of a display device which in use is in front of the user's head and follows the movements of his head, the direction of the user's head in predetermined cases controlling which part of the captured surrounding world is displayed to the user, said method comprising defining in a head direction area which substantially corresponds to the area towards which the user can direct his head, an inner head direction area and an outer head direction area, the outer area surrounding the inner area on all sides, detecting the user's head direction, detecting the user's gaze direction, and determining whether the head direction is in the inner head direction area or not, in a case when the head direction points in the inner head direction area, having head direction control which part of the captured surrounding world is displayed to the user, and changing to let the gaze direction control which part of the captured surrounding world is displayed to the user when the head direction no longer points in the inner head direction area and simultaneously either the gaze direction moves to a predetermined part of the image display area or a special command is given, and the point of the surrounding world pointed out by the gaze direction being continuously placed in a predetermined area of the image display area when the gaze direction controls the display to the user.

2. The method as claimed in claim 1, wherein the display device is always in front of the user's head and follows the movements of his head.

3. The method as claimed in claim 1, wherein in the image display area an inner image display area and an outer image display area are defined, the outer area surrounding the inner area on all sides, it is determined whether the gaze direction is in the inner image display area or not, and the change to letting gaze direction control which part of the captured surrounding world is displayed to the user occurs automatically when the head direction no longer points in the inner head direction area and simultaneously the gaze direction leaves the inner image display area.

4. The method as claimed in claim 1, wherein the point of the surrounding world pointed out by the gaze direction is continuously placed substantially in the center of the image display area when the gaze direction controls the display to the user.

5. The method as claimed in claim 1, wherein, in the case where the gaze direction controls the display to the user, an automatic return to head control of the display occurs when that part of the surrounding world which the user follows with his eyes has again entered the user's inner head direction area.

6. The method as claimed in claim 1, wherein, in the case where the gaze direction controls the display to the user, a return to head control of the display occurs when that part of the surrounding world which the user follows with his eyes has again entered the user's inner head direction area and the user gives a special command.

7. The method as claimed in claim 6, wherein the special command is given with the user's voice or hand.

8. The method as claimed in claim 1, wherein the special command is given with the user's voice or hand.

9. A device allowing a user to navigate in a surrounding world captured by one or more image sensors and displayed to the user in an image display area of a display device which in use is in front of the user's head and follows the movements of his head, the direction of the user's head in predetermined cases controlling which part of the captured surrounding world is displayed to the user, said device comprising a head position sensor which determines the direction of the user's head, a gaze tracker which determines the user's gaze direction, a display device capable of displaying part of the captured surrounding world to the user, a calculating unit, in which a head direction area is defined, which substantially corresponds to the area towards which the user can direct his head, said head direction area being divided into an inner head direction area and an outer head direction area, the outer area surrounding the inner area on all sides, the calculating unit calculating which part of the captured surrounding world is to be displayed to the user, the calculating unit, letting the head direction control which part of the captured surrounding world is displayed to the user when the head direction points in the inner head direction area and changing to let the gaze direction control which part of the captured surrounding world is displayed to the user when the head direction no longer points in the inner head direction area and simultaneously either the gaze direction moves to a predetermined part of the image display area or a special command is given, and the calculating unit continuously places the point of the surrounding world pointed out by the gaze direction in a predetermined area of the image display area when the gaze direction controls the display to the user.

10. The device as claimed in claim 9, wherein the display device is always in front of the user's head and follows the movements of his head.

11. The device as claimed in claim 9, wherein in the calculating unit the image display area is defined and its division into an inner image display area and an outer image display area, the outer area surrounding the inner area on all sides, the calculating unit determines whether the gaze direction is in the inner image display area or not, and the calculating unit automatically changes to let gaze direction control which part of the captured surrounding world is displayed to the user when the head direction no longer points in the inner head direction area and simultaneously the gaze direction leaves the inner image display area.

12. The device as claimed in claim 9, wherein the calculating unit continuously places the point of the surrounding world pointed out by the gaze direction substantially in the center of the image display area when the gaze direction controls the display to the user.

13. The device as claimed in claim 9, wherein the calculating unit, in the case where the gaze direction controls the display to the user, automatically returns to head control of the display when that part of the surrounding world which the user follows with his eyes has again entered the user's inner head direction area.

14. The device as claimed in claim 9, wherein at the calculating unit, in the case where the gaze direction controls the display to the user, returns to head control of the display when that part of the surrounding world which the user follows with his eyes has again entered the user's inner head direction area and the user gives a special command.

15. The device as claimed in claim 14, wherein the special command is given with the user's voice or hand.

16. The device as claimed in claim 9, wherein the special command is given with the user's voice or hand.

* * * * *